June 16, 1953 H. O. KYLIN 2,641,938
AUTOMATIC HEAD FOR MACHINE TOOLS
Filed Sept. 14, 1948 14 Sheets-Sheet 4

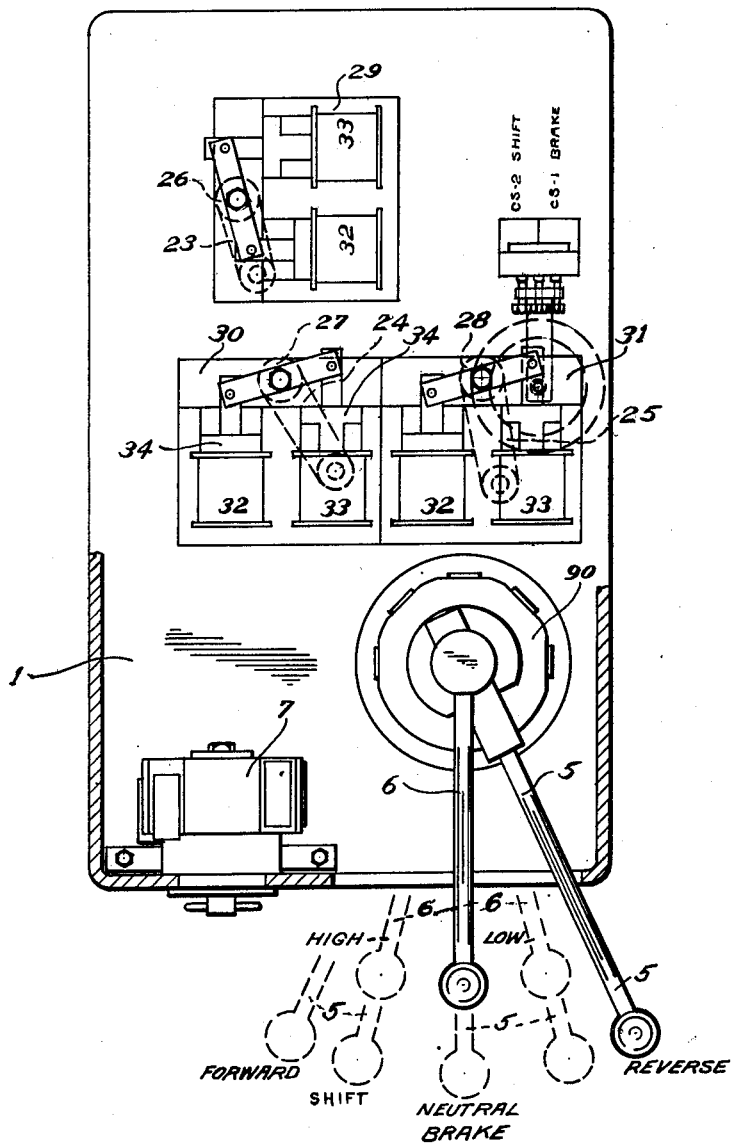

INVENTOR.
Henrik O. Kylin
BY
his Attorney

June 16, 1953  H. O. KYLIN  2,641,938
AUTOMATIC HEAD FOR MACHINE TOOLS
Filed Sept. 14, 1948  14 Sheets-Sheet 5

INVENTOR.
Henrik O. Kylin
BY
Hapgood & Van Hoey
his Attorneys

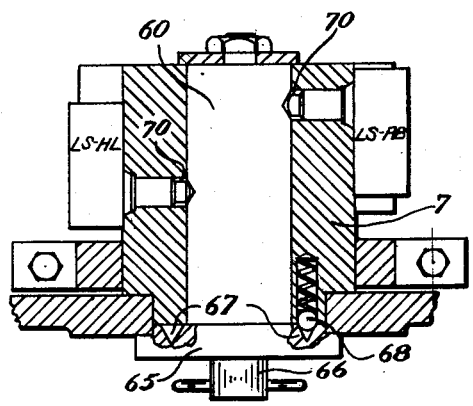
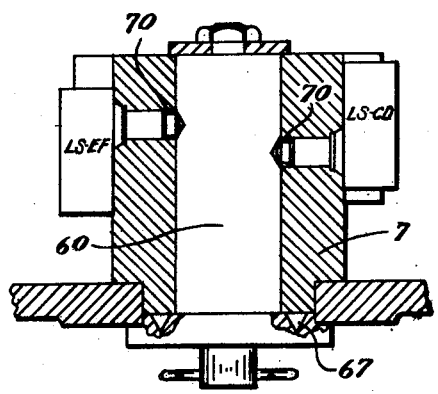
Fig. 18  Fig. 19
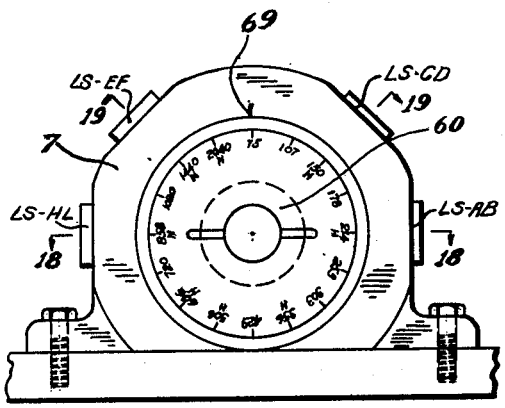
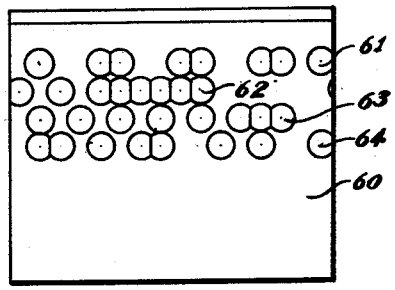
Fig. 17  Fig. 20
INVENTOR.
Henrik O. Kylin
BY Haywood & Van Horn
his Attorneys

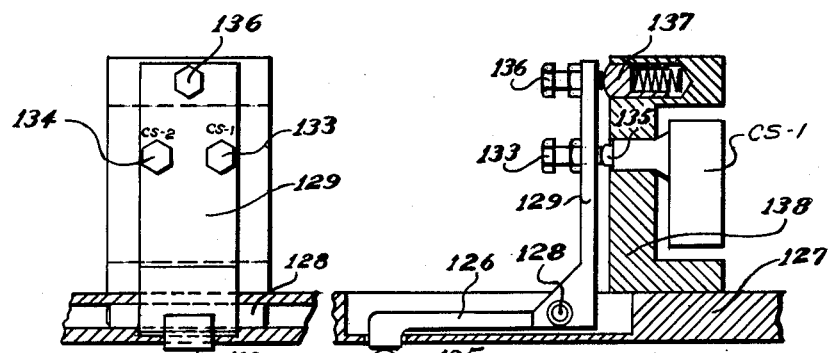
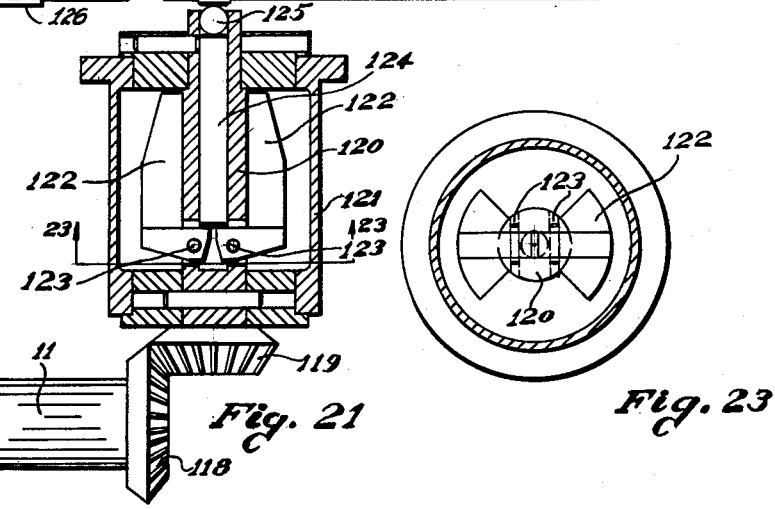
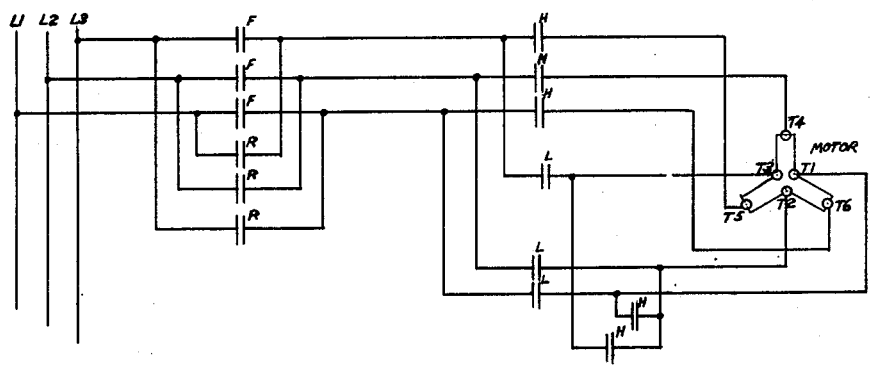

June 16, 1953 — H. O. KYLIN — 2,641,938
AUTOMATIC HEAD FOR MACHINE TOOLS
Filed Sept. 14, 1948 — 14 Sheets-Sheet 9
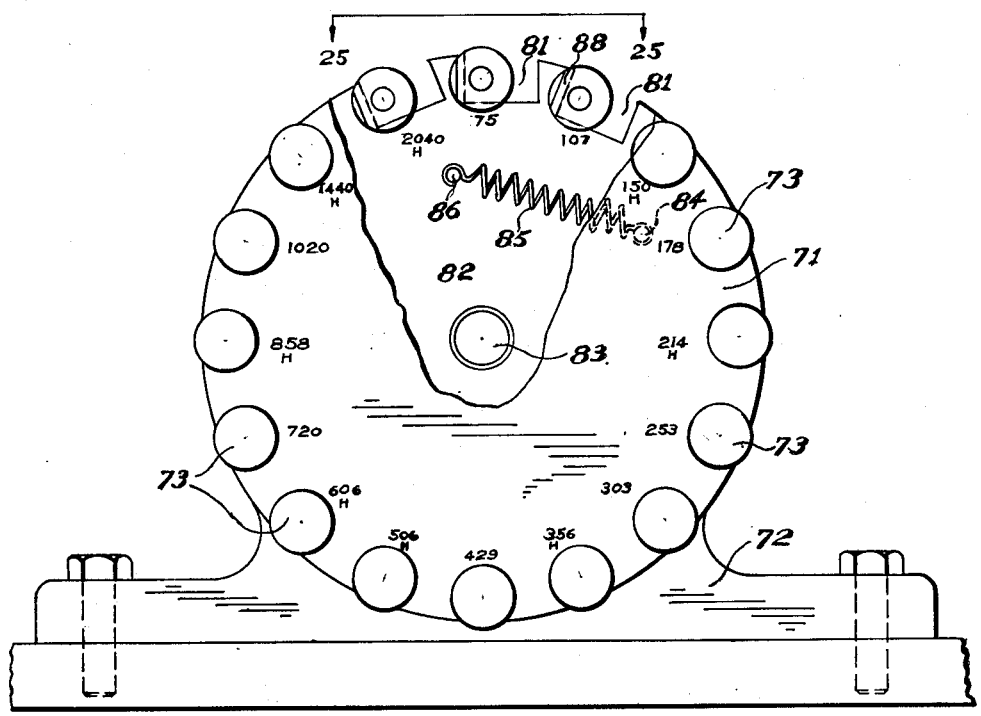
Fig. 24
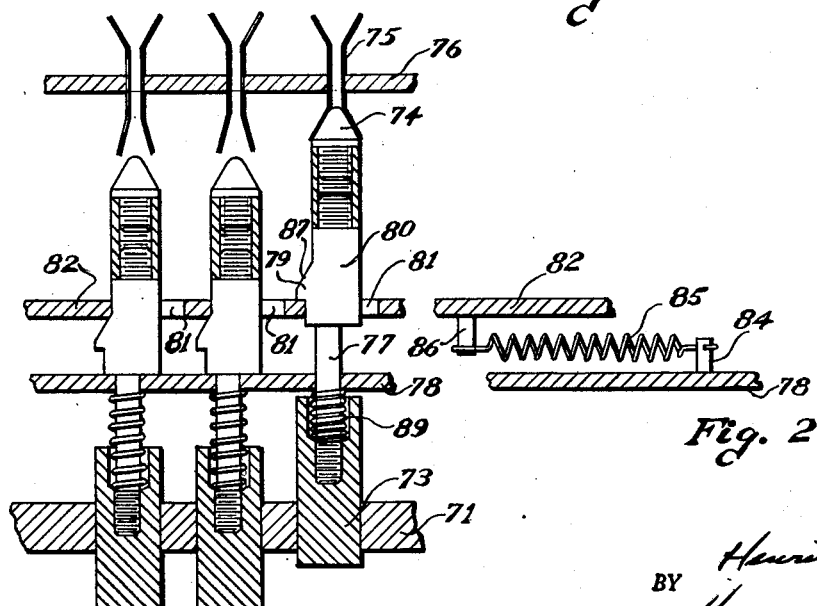
Fig. 25
Fig. 26
INVENTOR.
Henrik O. Kylin
BY Hawgood r Van Horn
his Attorneys Patented June 16, 1953

2,641,938

UNITED STATES PATENT OFFICE 2,641,938

AUTOMATIC HEAD FOR MACHINE TOOLS

Henrik O. Kylin, Cleveland, Ohio, assignor to Bardons and Oliver, Inc., Cleveland, Ohio, a corporation of Ohio Application September 14, 1948, Serial No. 49,266

7 Claims. (Cl. 74—472)

This invention relates to machine tools such as turret lathes and more particularly to means associated with the head of the machine for electrically effecting a preselected rate change in the spindle in either direction of rotation, together with means to stop or plug the rate change transmission down to a speed safe for automatically shifting gears.

It is one of the objects of my invention to provide electrically responsive means whereby an operator may, through a central control station, preselect a rate for the work spindle, and, preliminary to a rate change, stop or plug the selective gear transmission through which a plurality of spindle speeds or rates are available, and then impart the preselected rate to the spindle in either forward or reverse direction of spindle rotation.

Another object of the invention is the provision of a spindle rate preselecting switch having multiple positions representing the various spindle rates available in the transmission and having suitable connection through selected electrical circuits for effecting a rate change at the will of the operator.

A further object consists in the provision of electrical switch means responsive to the action of centrifugal force for effecting a slowing down or stoppage of the transmission just prior to a rate change in the spindle.

A still further object is the provision of a centralized single control on the head operable through suitable electrically responsive devices to effect a preselected rate change in the spindle in either a forward or reverse direction of spindle rotation when said control is moved about one axis, and to cause said spindle to stop or slow down to a safe rate prior to effecting a subsequent preselected rate change, when said control is moved about another axis.

Another object of the invention resides in the provision of means for automatically locking the gears of a sliding gear transmission in selected meshing engagement while the spindle is running at the desired rate, but operable automatically to release such of said gears as are required to be shifted in effecting a subsequent rate change.

Another object of the invention is the provision of a centralized control for the necessary manual operation of the machine.

Another object of the invention is the provision of two speed electric motor as prime mover together with means for selecting either motor speed in connection with a preselected spindle speed.

Other objects and advantages of my invention will become more apparent as the following description of one embodiment thereof progresses, reference being made to the accompanying drawings, in which like reference characters are employed to designate like parts throughout the same.

In the drawings:

Figure 3 is a top view of housing above the rate change transmission chamber of the headstock, with the cover removed and illustrating the relative locations of the main control switch, the rate preselecting switch, the solenoid shifting units and the centrifugal switch;

Figure 33:
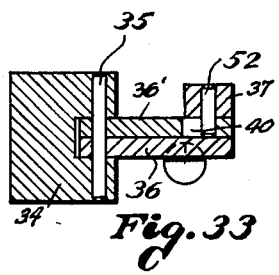
Figure 9:
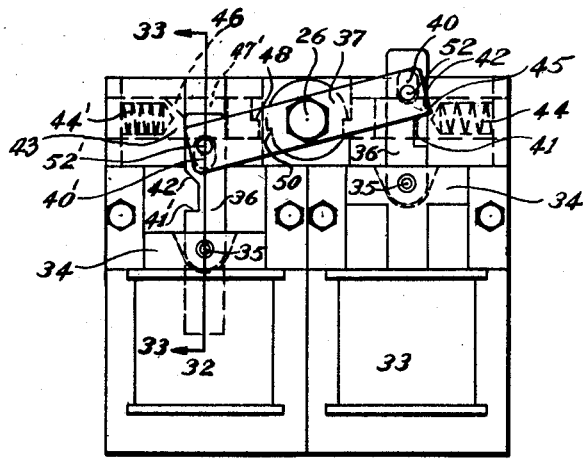
Figure 9 is a top view of a solenoid operated gear shifting unit illustrating the manner of releasably locking a gear cluster in mesh.
Figure 11:
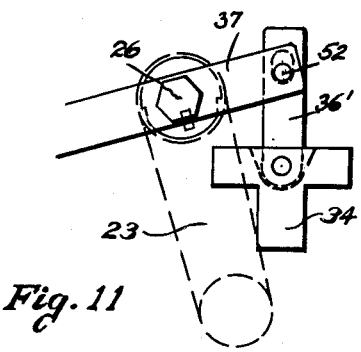
Figure 12:
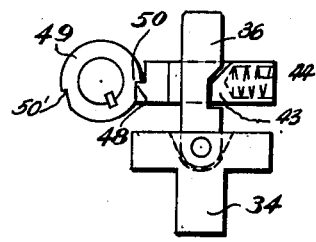
Figure 13:
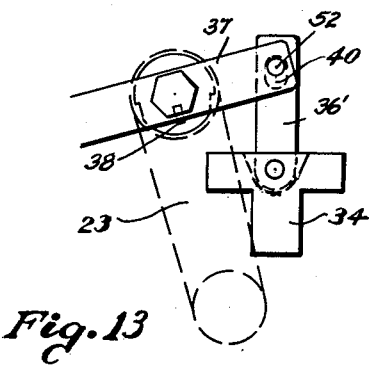
Figure 14:
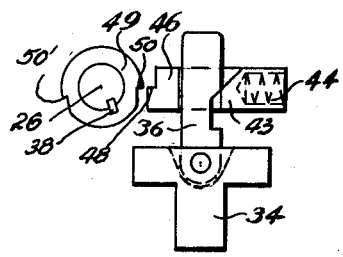
Figure 15:
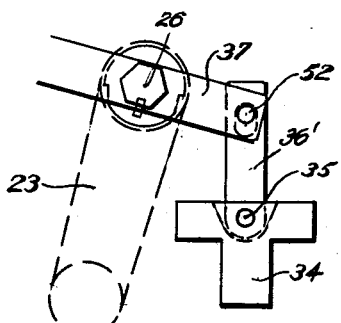
Figure 16:
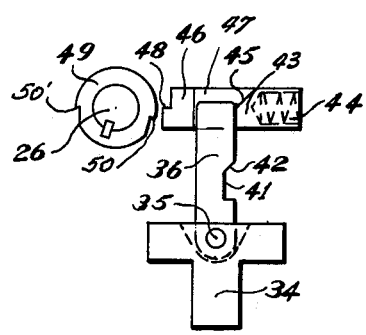
Figure 27:
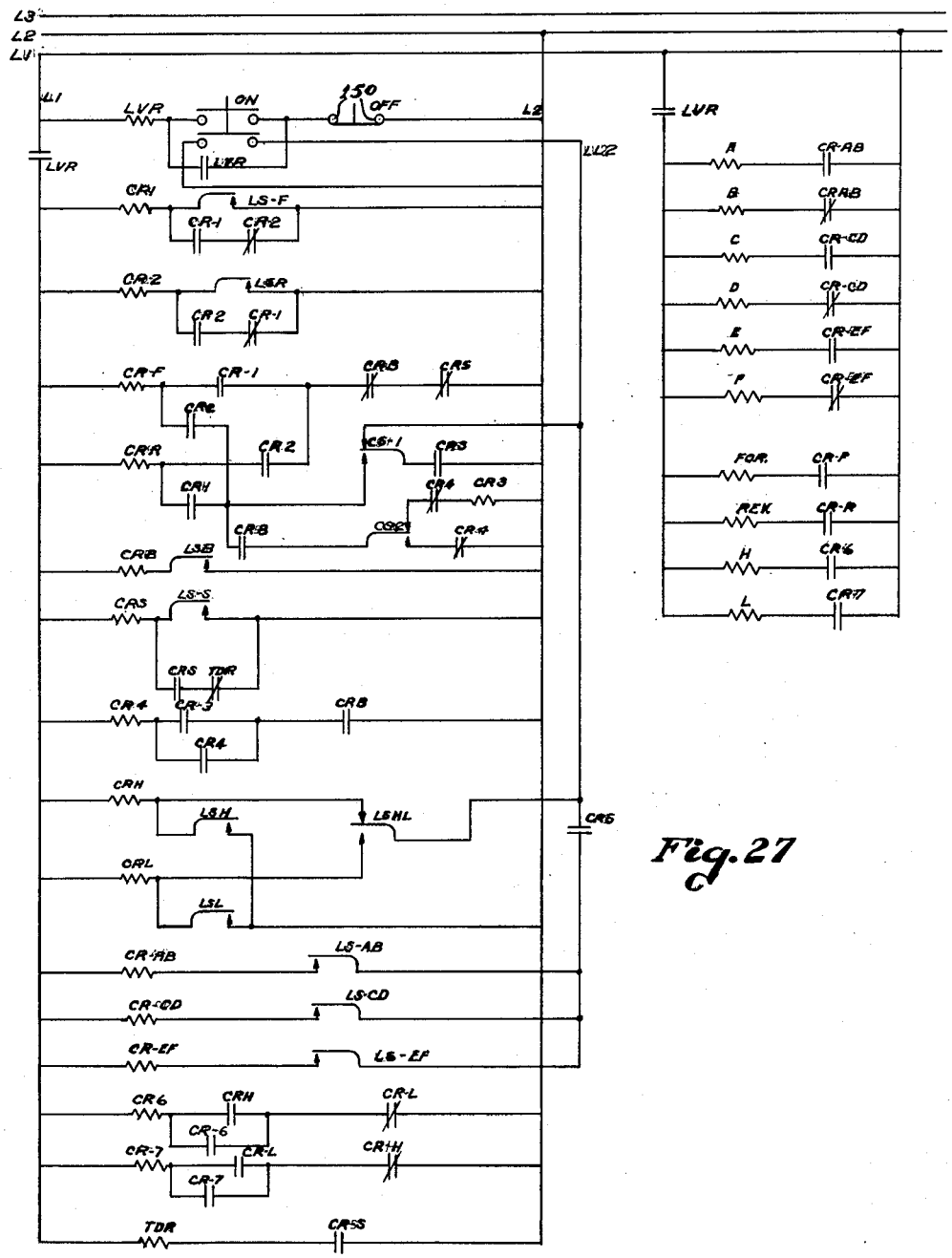
Figure 28:
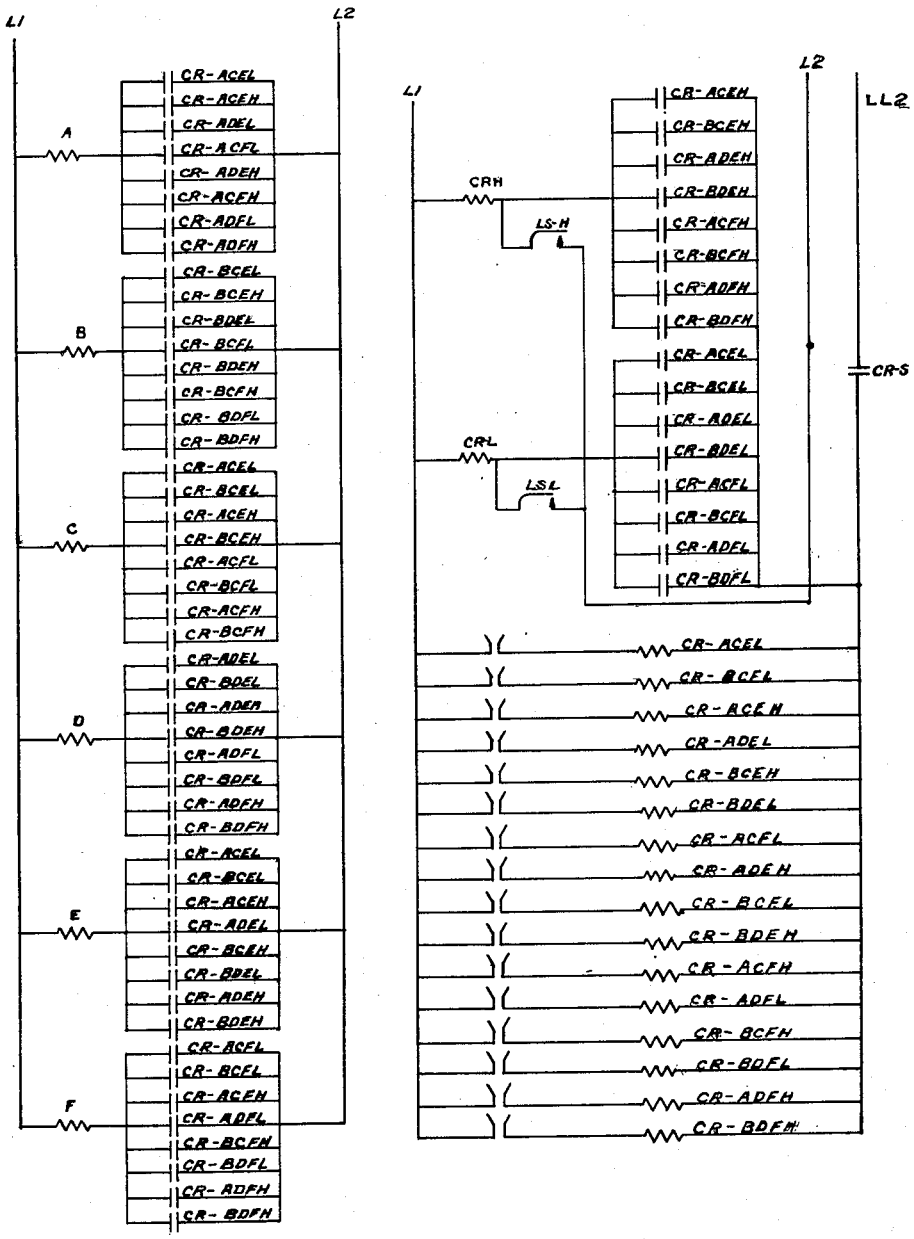
Figure 30:
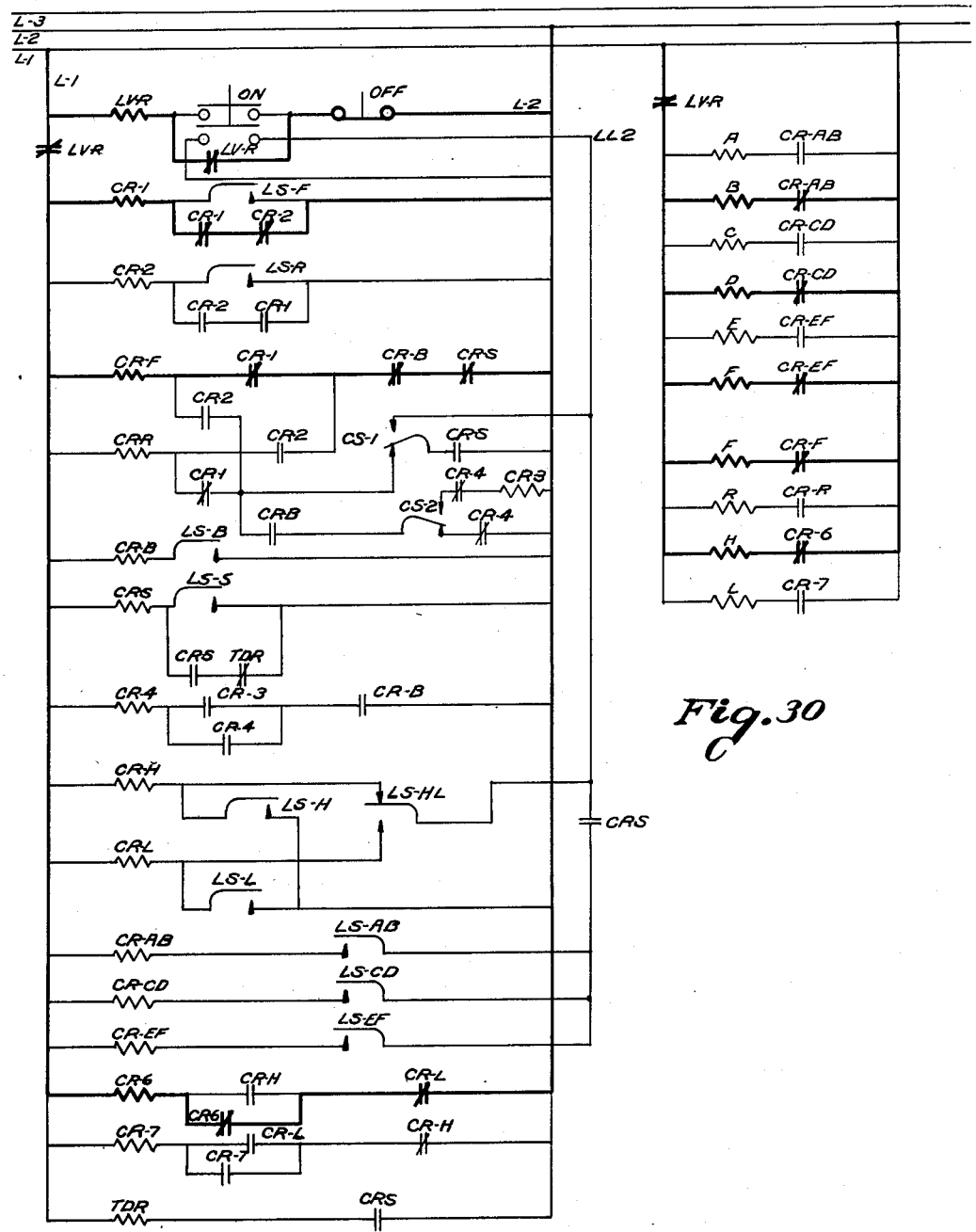
Figure 31:
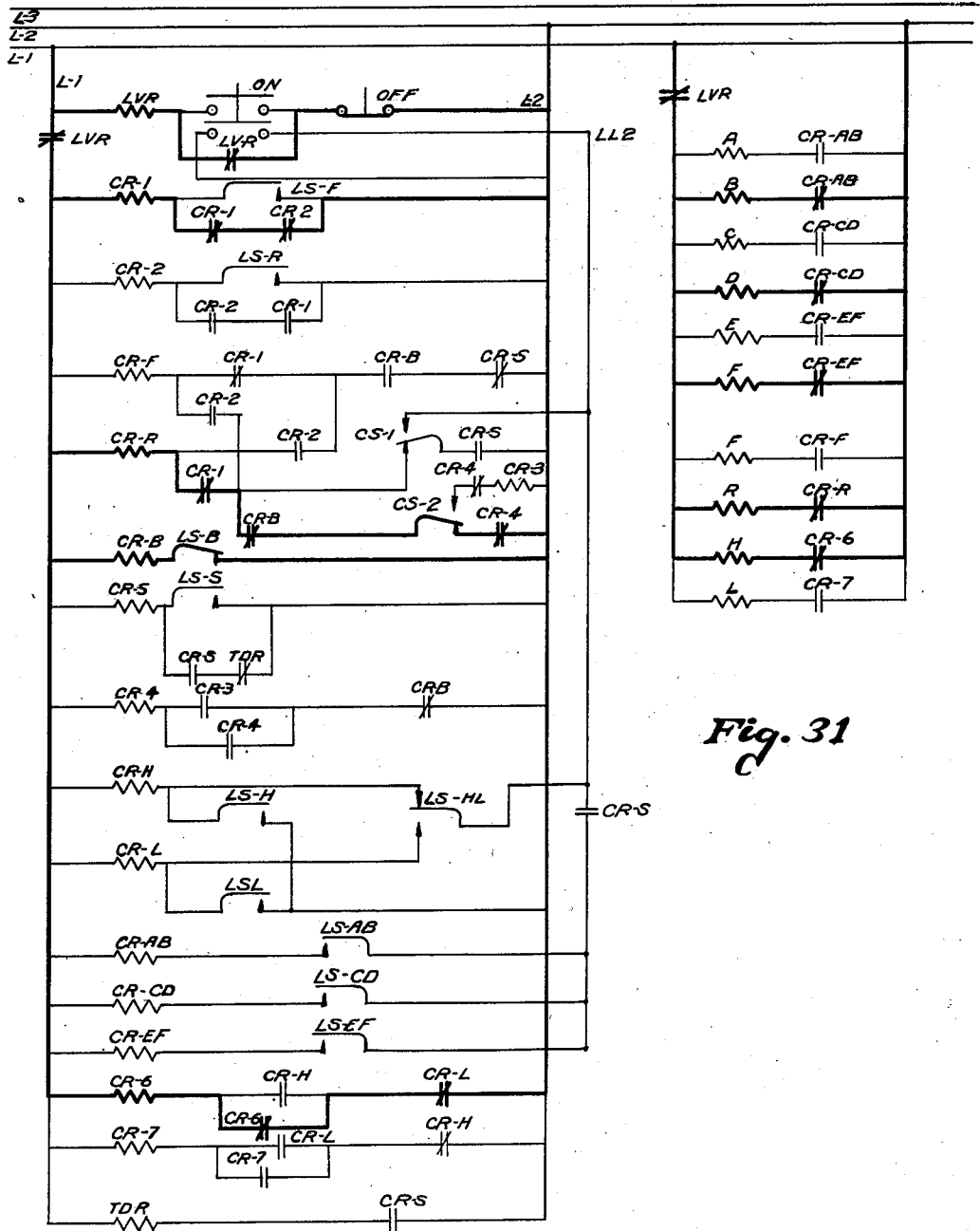
Figure 32:
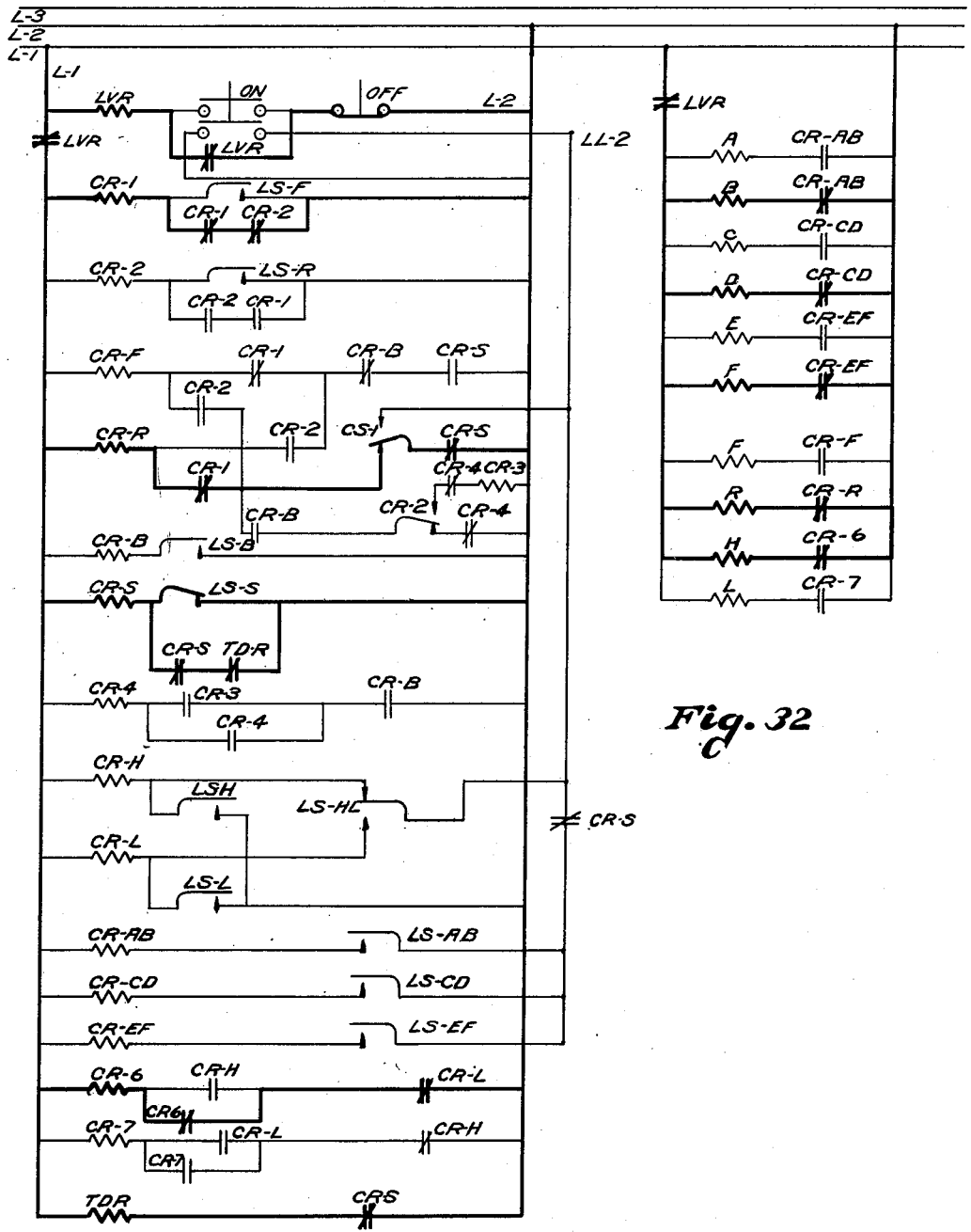

Figures 11 and 12, 13 and 14, and 15 and 16 illustrate respectively progressive positions of the solenoid plunger and associated mechanism for unlocking and shifting a gear cluster of the transmission, Figures 11, 13 and 15 being viewed from one side of the unit, while Figures 12, 14 and 16 are viewed from the opposite side;

Figure 17 is a front view of a preselecting switch by which the spindle speeds may be preselected;

Figure 18 is a section taken on line 18—18 of Figure 17;

Figure 19 is a section taken on line 19—19 of Figure 17;

Figure 20 is a development of the selector detent surface;

Figure 21 is a side view of a centrifugally operated limit switch device for slowing down the transmission preparatory to a rate change;

Figure 22 is a front elevation of the limit switch shown in Figure 21;

Figure 23 is a horizontal section taken on line 23—23 of Figure 21;

Figure 24 illustrates a modified form of preselecting switch forming a part of my invention;

Figure 25 is a plan view taken on line 25—25 of Figure 24;

Figure 26 is a fragmentary view of means for resetting the push button switches shown in Figures 24 and 25;

Figure 27 is a wiring diagram illustrating the control circuits for the spindle;

Figure 28 is a wiring diagram showing the circuits for the several control relays;

Figure 29 is a wiring diagram showing circuit for driving motor;

Figure 30 is a view similar to that of Figure 27 but shows in heavy lines the circuits employed preliminary to a rate change in a forward spindle running direction;

Figure 31 is a view similar to that of Figure 27 showing in heavy lines the circuits employed in reverse spindle running direction;

Figure 32 is a view similar to that of Figure 27 showing in heavy lines the circuits employed in shifting from one gear ratio to another selected ratio; and, Figure 33 is a section through one of the solenoids and associated parts taken on lines 33—33 of Figure 9.

I have illustrated my invention in the drawings as applied to a turret lathe, although it will be understood the same may be employed with other machine tools having a movable part which is to be driven at selected or preselected rates in either a forward or reverse direction.

Figure 1:
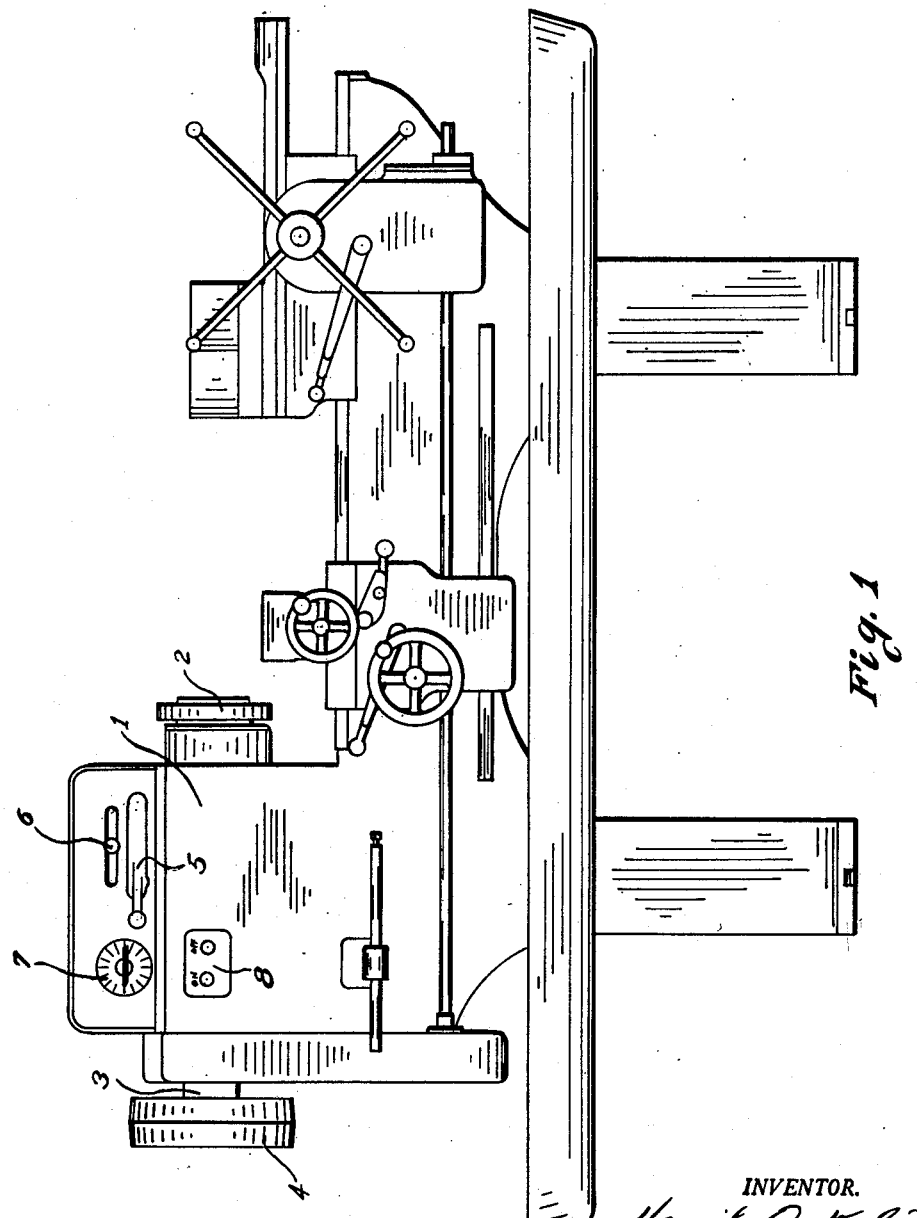
Figure 1 is a front elevation of a turret lathe embodying my invention showing the relative positions of the manual control station and the preselection switch, both on the headstock of the machine.

In Figure 1 the headstock is shown at 1 in which is housed a change gear transmission for imparting selected rates to a spindle 2. The drive shaft 3 may be equipped with a pulley 4 for belt drive with a prime mover (not shown) such as a reversible electric motor having two speeds, or the prime mover may directly drive the shaft 3. In this figure I have also shown the general organization and arrangement of the manual control switch 5 by the operation of which the spindle may be caused to rotate at a preselected rate in either direction and by means of which the rate may be changed by effecting a selected gear ratio in the transmission. Associated with the forward-reverse shifting control switch is a manually operated high-low switch 6 for utilizing either the high or the low driving motor rate with any selected spindle rate as indicated by the rate selector switch 7. 8 indicates an on-off switch located on the head.

Figure 2:
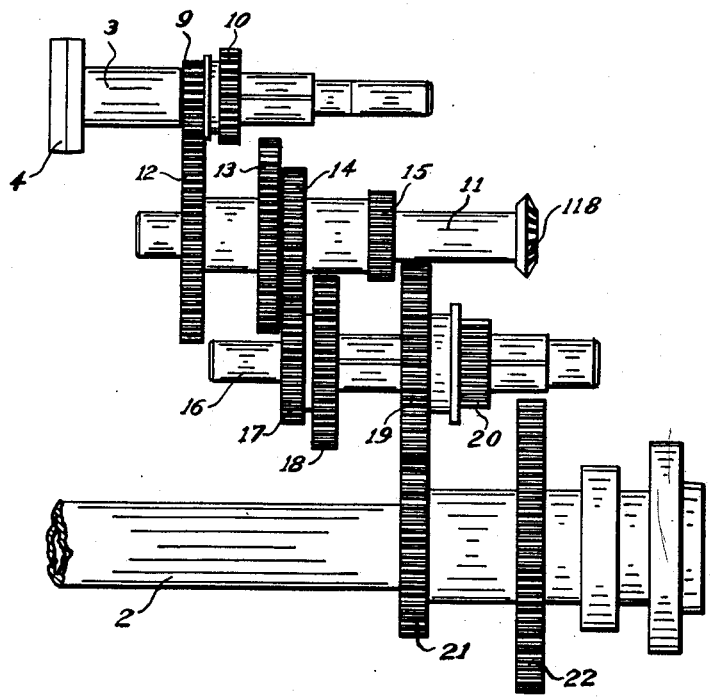
Figure 2 is a diagrammatic view of a rate change transmission contained in the headstock.

Referring now to Figure 2 I have illustrated in diagrammatic form a rate change transmission of more or less conventional design in which the drive shaft 3 is shown as splined carrying a sliding cluster gear 9 and 10. On the countershaft 11 are keyed the gears 12, 13, 14 and 15, the gear 12 being engageable with the gear 9 when the cluster is in the position shown, and the gear 10 being engageable with the gear 13 when the cluster is shifted to its other extreme position on the shaft 3.

A splined shaft 16 slidably carries the gear clusters 17—18 and 19—20 for meshing engagement respectively with the gears 14 and 15 and the gears 21—22 keyed to the spindle 2 depending upon the positions of the sliding clusters as will readily appear from the figure.

Figure 10:
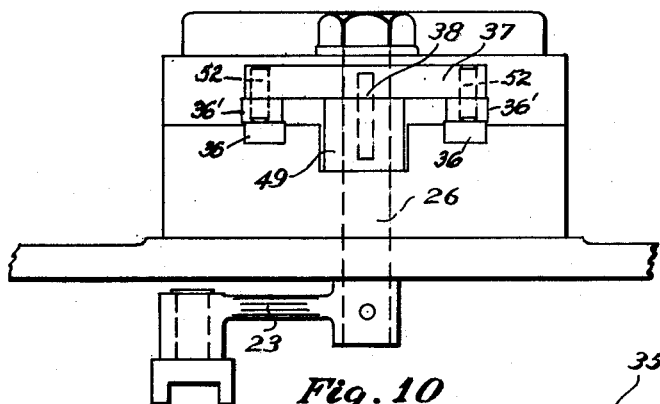
Figure 10 is a side view of the solenoid shifting unit shown in Figure 9.

Each of the three sliding gear clusters is operated on its splined shaft by a fork and lever illustrated at 23 in Figure 10 and at 23, 24 and 25 in Figure 3. Three fork and lever units are keyed to shafts 26, 27 and 28 respectively of the electrically responsive shifting units 29, 30 and 31. Each of the shifting units comprises a pair of solenoids mounted side by side as at 32 and 33, each solenoid having a plunger 34 axially movable therein and pivotally connected at 35 through linge 36 and 36¹ to the outer end of a cross bar 37. Each cross bar of each unit is keyed to the respective shafts 26, 27 and 28, as at 38, to rock the shaft when the respective cross bar is rocked and to thus move the fork and lever unit to slide the gear cluster which it controls.

It will be noted that when solenoid 32 is energized, its plunger 34 will be drawn axially into the coil, as in Figure 9, rocking the cross bar 37 to the position shown to withdraw the plunger 34 of the deenergized solenoid 33. This action is, of course, reversed when solenoid 33 alone is energized. In this connection I have provided simple means for locking the position of the rockable cross bar 37 and consequently the shaft to which it is keyed and the gear cluster controlled by said shaft, that is, locking the selected gears in mesh.

In Figures 3, 9 to 16 inclusive and Figure 30, I have illustrated one form of gear locking means which may be employed.

Referring first to Figure 3 wherein are illustrated the several solenoid operated shifting units and Figure 9 illustrating one of these units in more detail, the gear locking mechanism includes the link 36 pivotally connected at one end to the solenoid plunger as at 35 and which is provided with an elongated slot 40 near its outer end and running substantially longitudinally of the link. The link 36 is notched along its outer side as at 41, the notch having a beveled surface along its top side as at 42 to receive a portion 43 of a spring urged latch bar 46 normally urged toward the slot by means of the spring 44. This portion of the latch bar is also provided with a beveled surface 45 which is adapted to engage and ride along the beveled surface 42 of the notch of the link. The latch bar 46 is provided with a recessed portion 47 through which the link 36 is adapted to pass vertically, the opposite end of the latch bar 46 being formed with an off-set latch portion or stop 48 which is adapted to be projected into the path of the hub 49 keyed to the shaft 26 when the portion 43 of the latch bar is projected into the notch 41 of the link 36. This is more clearly shown in Figure 12, and when the portion 48 of the latch bar is in locking engagement with the notched portion 50 of the hub 49, the hub and consequently the shaft 26 will be locked against rotation in one direction or, in a clockwise direction in Figure 12, thus preventing disengagement of the meshed gear clusters controlled by the shifting unit carried on the shaft 26.

In order that longitudinal movement of the link 36¹ occasioned by energization of one of the solenoids 32 or 33 in the unit illustrated in Figure 9 may be translated to rock the bar 37 keyed to the shaft 26, the bar 37 carries at opposite ends a pin 52 positioned within the elongated opening 40 of the link 36¹ so that when the solenoid 33 in Figure 9 is energized to draw the corresponding plunger 34 downwardly, the link 36¹ will move downwardly until the upper end of the elongated slot 40 engages the pin 52. Continued downward movement of the link 36¹ will engage the pin with the top of the slot and cause the bar 37 to be rocked in a clockwise direction with the shaft 26 as illustrated in Figure 15, but it is to be noted that during the movement of the link 36 as represented in Figures 11 and 13 when the slotted portion of the link moves from the position shown in Figure 11 to that shown in Figure 13, there is no movement of the rocking bar 37. During this portion of the movement of the plunger 34, the link 36 which is also pivotally carried at 35 to the plunger will also move downwardly, the inclined surface 42 of the link notch 41 will engage, and there will be relative sliding movement between it and the beveled surface 45 of the latch bar to move the latch bar to the right against the compression of the spring 44 as indicated in Figures 12 and 14. This movement of the latch bar will, of course, disengage the offset portion 48 from the notched portion 50 of the hub 49, and continued movement of the links 36 and 36¹ downwardly will be translated to unlock and rock the bar 37 and the shaft 26.

As this function occurs, the pin 52¹ carried by the opposite end of the rocking bar 37 will engage the upper end of the elongated slot 40¹ formed in the link 36¹ actuated by the plunger of solenoid 32 and a rocking movement of the rock bar 37 as described above in a clockwise direction in Figure 9 will cause the plunger of the deenergized solenoid 32 to be lifted by the link 36¹, the link 36 thereof passing through the relieved portion 47¹ of the latch bar 46¹. The notched portion 41¹ or the link 36 then comes opposite the portion 43 of the latch bar 46¹ whereupon the compression of the spring 44¹ will thrust the portion 43 into engagement with the notch 41¹. In the meantime the rocking movement of the bar 37 in a clockwise direction will bring the notched portion 50¹ of the hub 49 into position to be engaged by the stop 48¹ on the inner end of the latch bar 46¹ thereby locking the position of the shaft 26 and of the shifting lever carried thereby against rotative movement in a counter-clockwise direction. Upward movement of the link 36¹ of solenoid 32 to its extreme upper position will cause the pin 52¹ to be engaged with the lower end of the elongated slot 41¹.

The operation of the several solenoid operated shifting units is substantially the same, and I have described only the operation of one unit, it being understood that in further disclosing this invention when reference is made to the sequence of operation of the various parts of the unit, such reference will serve to define its function in accordance with the above description.

In Figures 11 through 16, Figures 11 and 12 illustrate the relative positions of the mechanism including the gear shifting lever 23 when the latter is locked in one position to maintain a gear cluster in mesh with its associated gears in the transmission. In Figures 13 and 14 the same parts are illustrated, the position of the shifting lever 23 remaining unchanged. In these figures the initial downward movement of the links 36 and 36¹ for substantially a distance equal to the length of the elongated slot 40 is shown as representing the unlatching movement of the plunger and link 36 wherein the portion 43 of the latch bar 46 is urged out of the notched portion of the link 36 against the compression of the spring 44, thus unlatching the bar from the hub 49.

Figures 15 and 16 illustrate the remaining movement of the links 36 and 36¹ downwardly wherein the latch bar 46 is maintained out of the path of rotation of the hub 49, this further downward movement of the link 36 engaging the upper end of the elongated slot 40 of the link with the pin 52 carried by the rocking bar 37 to rock this bar to a position shown in Figure 15, it being understood that during this latter movement of the plunger and links 36 and 36¹, the links 36 and 36¹ of the solenoid 32 are moved upwardly with its plunger until the portion 43 of the latch bar 46¹ engages the notch 41¹ of link 36 and the latch 48¹ engages the notched portion 50¹ of the hub 49 to thereby lock the gear shifting lever 23 in the position shown in Figure 15.

In Figures 3, and 17 to 20 inclusive I have illustrated one form of preselector switch by which any one of a plurality of available spindle rates may be selected, while in Figures 24, 25 and 26 another form of selector means by which any available rate may be selected and employed is shown.

Referring presently to Figures 3 and 17 to 20 inclusive, the selector or preselector switch is mounted on the headstock of the machine and includes a housing 7 in which a plurality of limit switches HL, AB, CD and EF are carried and extend radially inwardly of the casing so that their respective plungers may project into engagement with the detented surface of the selector drum 60. In Figure 20 I have shown a development of the drum 60 illustrating the arrangement and spacing of the detents in the drum surface. It will be noted in this figure that there are four circumferential series of detents, the detents in each series being arranged with respect to one another and with respect to certain detents of the other circumferential series as to receive the plungers of the respective limit switches above referred to in a selected pattern depending upon the rotative position of the drum in the casing 7.

It will be noted that one circumferential series of detents indicated at 61 corresponds to and lies in the path of the plunger of limit switch AB, while the series of detents 62 are arranged to lie in the path of the plunger of the limit switch EF. Likewise the respective series of detents 63 and 64 lie in the path of the respective plungers of the limit switches CD or HL.

The drum 60 carries a dial 65 rotatable therewith and a forwardly projecting knob portion 66 for rotating the dial and the drum 60. The outer face of the dial is graduated in a manner somewhat similar to that shown in Figure 17 illustrating the various positions of the dial and drum in the casing available for selecting or preselecting a desired spindle rate. On the inner face of the dial 65 there is provided a circumferential series of detents 67 engageable by a spring pressed ball 68 mounted in the casing 7 so that the selected rate may be accurately obtained by lining up the desired rate as indicated on the dial with the pointer 69 marked on the casing.

It will be noted from an examination of Figures 18 and 19 that the several limit switches HL, AB, CD and EF are positioned in the casing so that the plungers will operate through openings 70 positioned at selected points in a direction axially of the drum 60 so that the plunger will operate in a radial direction with respect to the drum to engage the respective series of detents 61, 62, 63 and 64.

In Figures 24, 25 and 26 I have illustrated a modified form of preselector or selector switch which may be used in place of that form already described. In this form of switch it will be noted that I have employed a plurality of push buttons arranged in a circumferential series on a face plate 71 which is carried by a base 72 bolted to the headstock of the machine, the push buttons being indicated generally at 73, each of which when depressed engaging its terminal inner end 74 with spring contacts 75 carried on an insulating support 76. The shafts 77 of the respective push buttons operate axially through a disc 78 and each is provided with a cam and stop 79 formed on the member 80 which in turn operates through an opening or slot 81 in a locking disc 82 rotatable on a shaft 83. The fixed disc 78 is provided with a stud 84 in which one end of a tension spring 85 is anchored, the other end of the spring 85 being fixed in a stud 86 carried by the rotatable disc 82, to normally urge the disc 82 to move in a clockwise direction in Figures 24 and 25, by allowing the disc to move in a counterclockwise direction when one of the switch push buttons is depressed as indicated by the right hand button 73 in Figure 25. Such movement of the disc 82, is caused by sliding engagement of the inclined surface 87 of the cam stop with the side wall 88 defining the opening 81 as the button is depressed. However, when the button and switch shaft 77 reach their inner limit of travel, the cam stop will have assumed the position shown in Figure 25, that is, beyond the disc 82 and beyond the opening 81, whereupon the tension spring 85 will rotate the disc 82 in a clockwise direction to lock the depressed button in that position and consequently close the circuit through the respective spring contacts 75 engaged or bridged by the conductor end 74 of the push button.

It will be seen that a depressed push button may be released only by depressing another selected push button switch in the series. When neither push button is depressed, the disc 82 will be rotated in a counterclockwise direction as described above to bring the openings 81 into alignment with the cam stop 79 and to permit the previously locked depressed button to be released and re-set by the compression of its re-setting spring 89.

Referring now more particularly to Figures 3 to 8 inclusive, I have shown a control station comprising two levers, one movable selectively to positions for effective rotation of the spindle at selected rates either in a forward or reverse direction, to plug or brake the prime mover, driving the spindle preparatory to changing the spindle rate, and to shift from one selected rate to another throughout a range of rates available through the transmission, the other lever being movable to select either the available high or low speed of a multiple speed driving motor having driving connection with the shaft 3 through a pulley 4 and a belt (not shown).

This control is located on the headstock as indicated at 5 and 6 in Figure 1, preferably adjacent the preselector switch 7, and includes a body 90 having an axial opening 91 within which the sleeve 106 and shaft 93 are rotatably mounted in coaxial relationship to permit movement of the respective control levers 5 and 6 about a vertical axis in either direction. The lever 5 which controls the actuation of the forward, reverse, braking and shifting limit switches, LS—F, LS—R, LS—B, and LS—S respectively is also capable of movement about a horizontal axis located in the pin 94 when the lever 5 is in the shifting position to actuate the limit switch LS—S. The lever 5 is normally urged to its horizontal position as shown in full lines in Figure 4 by means of the spring pressed plunger 95 carried by the lever and engaging the bearing surface 96. Suitable stop pins 97 and 98 are provided on the base 90 and project in the path of movement of the lever 5 about its vertical axis to limit such movement between said pins.

Figure 6:
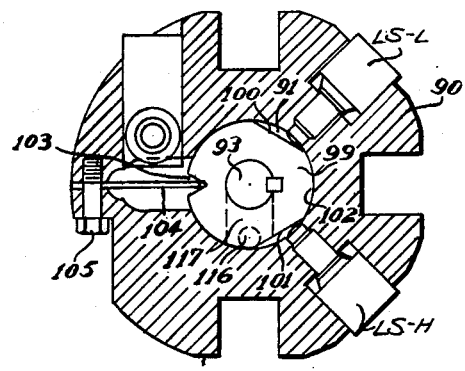
Figure 6 is a view taken on line 6—6 of Figure 4.
Figure 4:
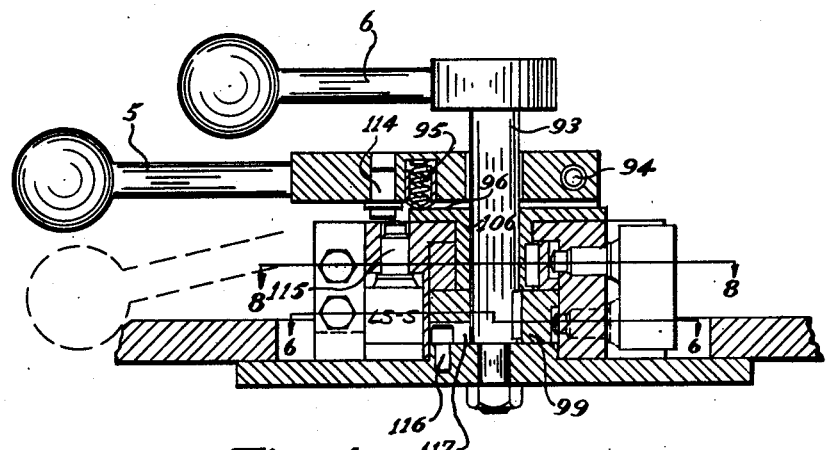
Figure 4 is a vertical section through the main control switch showing the forward-reverse control lever capable of movement about a vertical axis during the forward and reverse spindle running positions and about a horizontal axis for effecting a rate shift.

With particular reference to Figure 6 it will be noted that I have provided a cam 99 keyed to the shaft 93 and rotatable with the shaft in the axial opening 91 of the body 90. This cam is provided with two flats 100 and 101 and with a nose 102 therebetween. When the lever 6 is in neutral position as at N in Figure 3, the parts will be in their relative positions as shown in Figure 6. The plungers of the limit switches LS—L and LS—H project radially through the body 90 and normally into the respective spaces between the flats 100 and 101 and the inner wall of the opening 91 as shown in this figure. Diametrically opposite the nose 102 there is provided a V recess 103 opening outwardly to receive the end of a leaf spring 104 anchored in the body by means of a bolt 105. By this means the cam 99 is normally urged to the position shown in Figure 6, but when the lever 6 and the shaft 93 are moved for instance to the left in Figure 3, the cam 99 will rotate in a clockwise direction, flexing the spring 104 and bring the nose 102 of the cam opposite the plunger of the limit switch LS—H, thereby depressing the plunger and operating the switch as will be described in detail hereinafter. Likewise an opposite movement of the lever to the right in Figure 3 will cause the cam to rotate in a counter-clockwise direction to depress the plunger of the limit switch LS—L.

Figure 8:
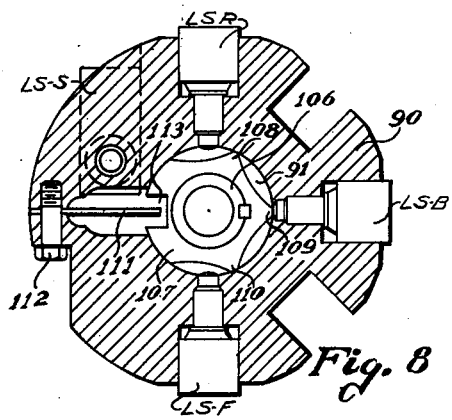
Figure 8 is a view taken on line 8—8 of Figure 4.
Figure 5:
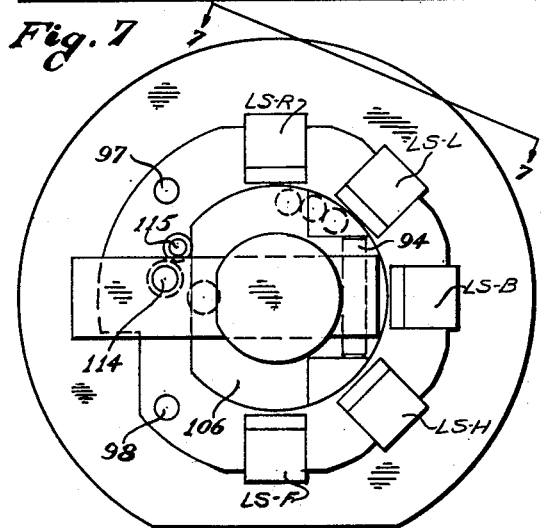
Figure 5 is a top plan view of Figure 4.

Keyed to rotate with the sleeve 106, movable with a shifting of the lever 5, is a cam 107 having a plurality of noses 108, 109 and 110 which, depending upon the rotative position of the cam, are adapted to engage and depress the plungers of the limit switches LS—R, LS—B and LS—F respectively, the peripheral portions of the cam between these respective noses being relieved so as to provide clearance for the normally projecting plungers of these limit switches. The normal position of the cam 107 is illustrated in Figure 8, there being a leaf spring 111 secured in the body 90 by means of a bolt 112, which projects into a recessed portion of the cam indicated at 113 to be engaged by one or the other of the side walls of this recessed portion, depending upon the direction of rotation of the cam when operating the lever 5.

The lever 5 carries a stud 114 projecting below its under surface for engagement with the normally projecting plunger 115 of the limit switch LS—S when the lever is moved to gear shifting position and the stud 114 is in substantial alignment with the plunger 115. When the parts are in this position and the lever is depressed as indicated by the broken lines in Figure 4, the stud will engage the plunger 115 to depress it and thus operate the limit switch LS—S.

In Figure 6 I have provided a stop pin 116 projecting upwardly from the base of the control into a radial opening 117 formed in the bottom wall of the cam 99 limiting the shifting movement of the lever 6 thereby in either direction. In Figure 6 the stop 116 is shown substantially midway between the side walls of the opening 117 which represents the neutral position of the lever 6 as indicated in Figure 3.

Figure 7:
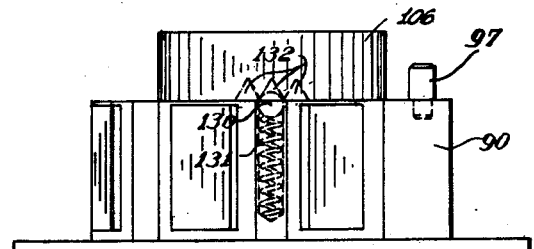
Figure 7 is a side elevation of the device shown in Figure 4.

For properly locating the forward, brake and reverse positions of the lever 5, I have provided a spring pressed ball 130 urged upwardly by the spring 131 for engagement with any one of the detents 132 to indicate to the operator when the lever is in the selected proper position. The three detents 132 correspond to the three aforesaid positions of the lever 5, the detent to the left in Figure 7 representing the "reverse" position of the lever, the intermediate detent representing the "brake" position of the lever, while the detent on the right corresponds to the "forward" position of the lever.

I have also provided means to stop or slow down or plug the transmission to a pre-determined speed for safely and automatically shifting gears. According to this invention I have provided such means which is centrifugally responsive in the operation. More specifically, referring to Figures 21, 22 and 23, the driven shaft 11 of the transmission carries a gear 118 in mesh with a gear 119 for driving the shaft 120 of the centrifugally responsive device 121. This device includes a pair of fingers 122 pivotally connected at 123 to the shaft 120 and rotatable therewith. Within the hollow shaft 120 there is provided a rod 124 extending axially thereof and terminating short of the top of the hollow shaft 120 to accommodate therein a ball bearing 125. At increased rates of rotation of the shafts 11 and 120 centrifugal force will cause the fingers 122 to move outwardly of the shaft 120, and to thus raise the rod 124 in the hollow shaft to rock the lever 126 carried by the support 127 for the limit switch CS-1. The lever 126 is pivoted to the base 127 at 128 and has an arm 129 extending upwardly as shown in Figure 21.

This arm 129 carries the adjustable bolts 133 and 134 arranged side by side and in alignment with the plungers 135 of the limit switches CS-1 and CS-2 respectively, there being an adjustable bolt 136 carried in the upper end of the arm 129 for engagement with the spring pressed plunger 137 carried in the support 138. The plunger 137 is normally urged outwardly in engagement with the inner end of the bolt 136 to in turn normally urge the lever 126 downwardly against the ball 125 and the rod 124; however, when the rate of rotation of the hollow shaft 120 is increased and the fingers 122 are forced outwardly by centrifugal force, the rod 124 will move upwardly in the shaft to raise the lever 126 and to move the arm 129 to the right in Figure 21 against the compression of the spring pressed plunger 137 to actuate the respective plungers 135 of the centrifugal switches CS-1 and CS-2.

The centrifugal switches CS-1 and CS-2 are closed as indicated in the wiring diagram of Figures 30, 31 and 32 due to the actuation of the centrifugal device under operating rates but are normally open when the spindle is not moving as in Figure 27. The operation of this unit will be described in conjunction with the description of the operation of the machine under operating conditions.

In Figures 27, 28, 29, 30, 31 and 32 I have shown the wiring diagrams for accomplishing the several functions and purposes of the invention. In the interest of clarity I have shown in Figure 27 the wiring diagram with the various electric units thereof in their normal position while the machine is at rest, while in Figures 30, 31 and 32 the same diagram is illustrated but those portions of the circuits which are affected under certain conditions of operation are shown in heavy lines in the said several views, i. e., in Figure 30 the diagram is lined heavily for those circuits employed when the spindle is running in forward direction, and in Figure 31 the heavy lined portion thereof illustrates those portions of the circuit employed just after the braking sequence is initiated by depressing the lever 5 to actuate the limit switch LS—B, while Figure 32 is heavily lined to indicate those portions of the circuit in use just after the shifting sequence is initiated by energizing the limit switch LS—S. In this instance it will be noted that when the speed of the transmission reaches a pre-determined value, centrifugal switch CS-1 will close the circuit through LL-2 to L-2. This will effect a shifting of the gears in the transmission according to the circuits determined by LS—AB, LS—CD, LS—EF and LS—HL.

More specifically the operation of the invention may be described as follows:

Assuming that the spindle is at rest, the various electric controls will be as indicated in Figure 27. When it is desired to operate the spindle, say in a forward direction at a preselected or selected rate, the operator selects such rate by turning the selector dial 60 until the selected rate indicated on the dial is opposite the mark 69 on the casing 7 and, being ready to set the spindle into motion, he depresses the "on" button of the "on-off" switch 8.

Since the "off" button will bridge the contacts 150 when the "on" button is depressed, it will be seen that current will flow from L-2 through the relay LVR to L-1. When this relay is energized, the normally open relay switch LVR will be closed as indicated in Figure 30 maintaining a flow of current from L-1 to L-2 through LVR as well as to the remainder of the wiring circuit therebelow.

While the "on" button is depressed, current flows through control relay CR—H or control relay CR—L depending upon the position of the selector dial 60 and the rate selected. If the rate selected is one requiring the driving motor to operate at its high speed rate, then the control relay CR—H will be energized, and conversely CR—L will be energized where the rate selected is one obtained through the low speed of the driving motor. Assuming that the selected rate is one obtained through the high speed of the driving motor and that CR—H is energized, the limit switch LS—HL will be actuated to close the circuit from LL-2 through control relay CR—H, in the present example. Simultaneously control relay CR-6 is energized to actuate the motor contactor H (Figure 29). The driving motor is now set to run at its high speed level.

When it is desired to set the spindle in forward motion at the selected rate, the operator moves the lever 5 to the extreme left as in Figure 3 to its "forward" station. In so doing the point 110 of the cam 105 engages the plunger of the limit switch LS—F and depresses the same causing current to flow through control relay CR-1 to close the normally open contacts of CR-1 allowing current to flow therethrough and through the normally closed contacts CR-2 bridging the limit switch LS—F. Control relay CR-1 remains energized after limit switch LS—F is opened or the forward-reverse lever 5 is in the first detent position as described hereinbefore.

When the contact of control relay CR—1 is closed, the control relay CR—F is energized.

When the "forward-reverse" lever 5 is moved to the forward position as indicated in broken lines in Figure 3, the normally open limit switch LS—F will be closed energizing the control relay CR—1 and closing all normally open contacts CR—1 as illustrated in Figures 27 and 30. The control relay CR—1 remains energized after the limit switch LS—F is opened or while the "forward-reverse" lever is in the detent position to the left in Figure 7. At the same time it will be noted that the control relay CR—F which is normally deenergized is energized when the contact of CR—1 is closed. Under these conditions the motor contactors F in Figure 29 will be actuated to supply current to the motor, to drive the motor in forward rotation.

With the motor and the transmission running the centrifugally responsive device illustrated in Figures 21, 22 and 23 will operate to close centrifugal switches CS—1 and CS—2 as shown in Figure 30.

The control lever 5 then may be moved to the intermediate detent position as shown in Figure 7 which corresponds to the "neutral" or "braking" position, and in such position the limit switch LS—B will be actuated to close the circuit from L—2 to L—1 energizing the control relay CR—B, opening the circuit through control relay CR—F and causing the "forward" motor contactors to open as illustrated in Figure 31. During this position of the lever 5 the control relay CR—R is energized through contact CR—1, CR—B, centrifugal switch CS—2 and contact CR—4, the latter of which refers to motor contactor R (Figure 31) and causes the motor to dynamically plug toward a reversed rotation, thereby effecting a braking action in the motor to reduce its forward speed to a predetermined low rate of rotation determined by the setting of the centrifugal device shown in Figure 21 whereby the centrifugal switch CS—2 actuated by the said device will be opened.

Opening of the circuit through CS—2 will energize control relay CR—3 through contact CR—4 as shown in Figure 27.

Control relay CR—4 in turn closes through contacts CR—3 and CR—B. Control relay CR—4 then opens up the normally closed contacts at lines from CR—4. The circuit established through control relay CR—R as in Figure 31 is in turn opened, opening the contactors R (Figure 29), thus stopping the motor. Any further rotation of the transmission by external means other than the motor, sufficient to cause the centrifugal switch CS—2 to become depressed, will not permit the relay CR—R to close.

The speed of the motor may be changed as explained above by shifting the lever 6 from one position to the other. If the lever is moved to the right in Figure 3 or to low speed position, the limit switch LS—L will be closed, energizing the control relay CR—L and subsequent control relay CR—7 and the motor contactors L (Figure 29). By such means either the high or the low speed of the motor may be made available in either its forward or reverse direction of rotation.

With the "forward-reverse" lever 5 in shifting position a preselected spindle rate as determined by the setting of the preselector switch, may be obtained by depressing the lever 5 to close the limit switch LS—S. Referring to Figure 32 closing of the limit switch LS—S by brief depression of the lever 5 will energize the control relay CR—S which remains energized through the contacts CR—S and TD—R (time delay relay). The circuit through CR—F is broken and control relay CR—R is energized through control relay CR—1, switch CS—1 and contact CR—S. When the rate of rotation of the spindle drops below a predetermined critical point centrifugal switch CS—1 moves to its normal position as shown in Figure 27. Line LL—2 is then connected through to L—2 energizing control relays CR—AB, CR—CD, CR—EF, CR—H, CR—L, depending upon the positions of the limit switches LS—AB, LS—CD, LS—EF, LS—HL as determined by the preselector switch. Thus in turn the gear shift solenoids A or B, C or D, E or F and CR—6 or CR—7 and subsequently H or L will be energized.

When the control relay CR—S is energized, the time delay relay TD—R is also energized through closing the contacts CR—S thus holding this circuit closed for a predetermined time interval, whereupon the normally closed contact TD—R is opened, deenergizing control relay CR—S, thus restoring the contacts to their respective positions at the start and again energizing the motor to run in a forward direction.

In Figure 28 is illustrated an electrical wiring diagram forming a counterpart of that shown in Figure 27, when the type of preselector switch shown in Figures 24 and 25 is employed. As described above this type of selector or preselector is operated by means of push button switches and a latching mechanism.

In Figure 28 the respective selector push button switches are connected to control relays and switches CR—ACEL through CR—BDFH, while the control relays and switches CR—H and CR—L of Figure 27 are replaced by CR—H and CR—L in the present figure. The shift solenoids A, B, C, D, E and F, Figure 27, are shown by the same designation in Figure 28 and are operated in the manner illustrated.

In the operation of the selector switch shown in Figures 24 and 25 with the circuit shown in Figure 28 as a spindle rate is selected, for instance, a rate corresponding to the control relay CR—ACEL, the corresponding push button is depressed and latched. With the drive running forward, the shift cycle is started by moving the control lever 5 to the "shift" position and by depressing it in this position. The driving motor is thus plugged to a slow predetermined speed and line LL—2 is thereby connected to line L—2. Control relay CR—ACEL is energized closing contacts, energizing solenoids A, C, E, and CR—L. After a predetermined time delay, the driving motor starts up in the same manner as described hereinbefore and of course subsequently to the selected gear ratios established through the transmission. The same operation occurs when any other of the available rates is selected and the corresponding push button on the preselector depressed and latched, the effective circuits being established through the proper control relays and switches depending upon the rate selected and the corresponding push button depressed. This is clearly illustrated in Figure 28.

I claim:

1. In a machine tool, an electric driving motor, a spindle, selective gear transmission means for rotating said spindle in forward or reverse directions at any one of a plurality of selected rates, a rate change selector, electrically responsive means actuated by said rate changer for selecting the gear ratios available in said transmission, a motor plugging circuit, and a single control member operable through a cycle including the steps of closing the motor plugging circuit prior to a rate change, effecting a rate change, and subsequently energizing said motor to drive said transmission.

2. In a machine tool, an electric driving motor, a spindle, selective gear transmission means for rotating said spindle in forward or reverse directions at any one of a plurality of selected rates, a rate change selector, electrically responsive means actuated by said rate changer for selecting the gear ratios available in said transmission, a motor plugging circuit, a time delay or holding circuit, and a single control member operable to effect a rotation of said spindle at the selected rate in one direction, by first energizing said motor plugging circuit and said time delay circuit, and then subsequently selecting said gear ratios by energizing said electrically responsive means.

3. In a machine tool, an electric driving motor, a spindle, selective gear transmission means for rotating said spindle in either direction at any one of a plurality of selected rates, a rate change selector, electrically responsive means actuated by said rate changer for selecting the gear ratios available in said transmission, a motor plugging circuit, a time delay or holding circuit, and a single control member operable to effect a rotation of said spindle at the selected rate in one direction, by first energizing said motor plugging circuit and said time delay circuit, and then subsequently selecting said gear ratios by energizing said electrically responsive means, centrifugally responsive electrical means driven by said selective gear transmission in said plugging circuit to effect a slowing down or stopping of said driving motor just prior to effecting a subsequent rate change in said spindle.

4. In a machine tool, an electric driving motor, a spindle, selective gear transmission means for rotating said spindle in either direction at any one of a plurality of selected rates, a rate change selector, electrically responsive means actuated by said rate changer for selecting the gear ratios available in said transmission, a motor plugging circuit, a time delay or holding circuit, and a single control member operable to effect a rotation of said spindle at the selected rate in one direction, by first energizing said motor plugging circuit and said time delay circuit, and then subsequently selecting said gear ratios by energizing said electrically responsive means, centrifugally responsive electrical means driven by said selective gear transmission in said plugging circuit to effect a slowing down or stopping of said driving motor just prior to effecting a subsequent rate change in said spindle, said last named means being effective to initiate a preselected rate change in said spindle.

5. In a machine tool, a headstock, a work spindle rotatable in said headstock, means for rotating said spindle in forward or reverse directions of rotation, means for selecting a rate for said spindle, means for effecting a selected rate change, said last named means comprising a single control member operable in one plane to cause said spindle to rotate in a forward or reverse direction, and operable in another plane to effect a rate change in said spindle, a centrifugally responsive means driven by said spindle rotating means, and means actuated by said control member for slowing down said spindle preparatory to a rate change whereby said centrifugal means will respond to effect a rate change in said spindle, said centrifugally responsive means including a pivoted member, a normally closed limit switch and means on said member for operatively engaging said switch to open the same, and an electric circuit including said switch.

6. In a machine tool, a spindle, selective gear transmission means for rotating said spindle in either direction at any one of a plurality of selected rates, a rate change selector, electrically responsive means actuated by said rate changer for selecting the gear ratios available in said transmission, electrically responsive releasable means for locking the gears in their selected ratios, and a single control member operable to effect a rotation of said spindle at the selected rate in one direction, said locking means comprising a solenoid, a plunger operable thereby when the solenoid is energized, a pair of links carried by said plunger, a notched shaft, and a second plunger having a portion formed for locking engagement in said notch, said second plunger having a guide slot therein through which one of said links is operable, and cooperating means on said one link and said second plunger for permitting the said plunger to move into locked relation to said shaft.

7. In a machine tool, a spindle, selective gear transmission means for rotating said spindle in either direction at any one of a plurality of selected rates, a rate change selector, electrically responsive means actuated by said rate changer for selecting the gear ratios available in said transmission, electrically responsive releasable means for locking the gears in their selected ratios, and a single control member operable to effect a rotation of said spindle at the selected rate in one direction, said locking means comprising a solenoid, a plunger operable thereby when the solenoid is energized, a pair of links carried by said plunger, a notched shaft, and a second plunger having a portion formed for locking engagement in said notch, said second plunger having a guide slot therein through which one of said links is operable, and cooperating means on said one link and said second plunger for permitting the said plunger to move into locked relation to said shaft, said other link having loose pivotal connection with a cross head, and a cross head carried by said notched shaft.

HENRIK O. KYLIN.

References Cited in the file of this patent

UNITED STATES PATENTS

| Number | Name | Date |
|---|---|---|
| 1,285,371 | Powell et al. | Nov. 19, 1918 |
| 1,501,723 | Randolph | July 15, 1924 |
| 2,068,552 | Lange | Jan. 19, 1937 |
| 2,068,840 | Bennett et al. | Jan. 26, 1937 |
| 2,225,913 | Lange et al. | Dec. 24, 1940 |
| 2,359,064 | Van Hammersveld | Sept. 26, 1944 |
| 2,405,686 | Clark | Aug. 13, 1946 |
| 2,419,639 | Groene | Apr. 29, 1947 |
| 2,442,868 | Dare | June 8, 1948 |